Figure 1:
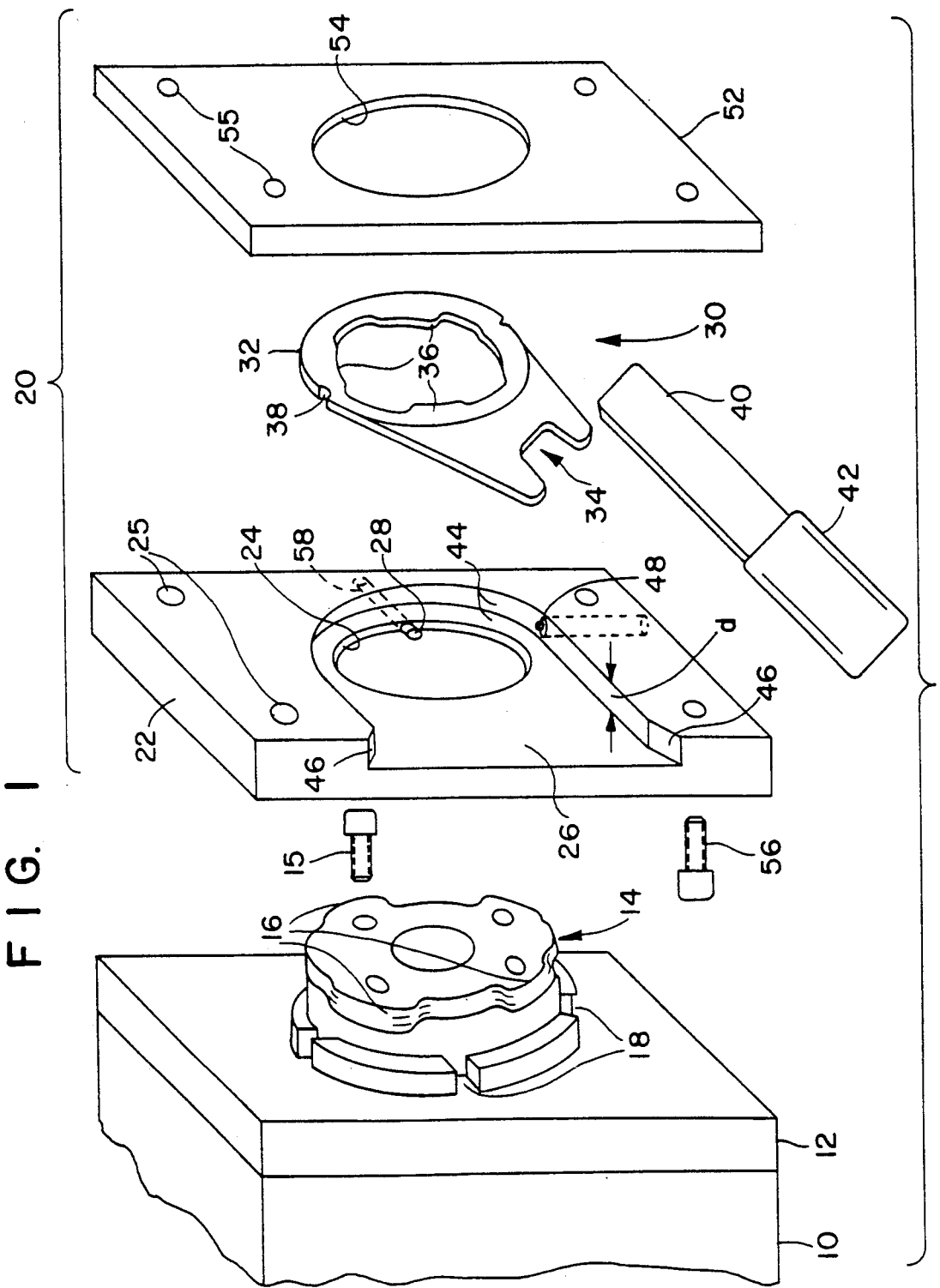

United States Patent [19]

Nicke et al.

[11] Patent Number: 5,308,234

[45] Date of Patent: May 3, 1994

[54] GRIPPING DEVICE FOR TWO PART MOLDS

[75] Inventors: Horst Nicke, Dautphatal; Hans Hackler; Hans-Georg Wied, both of Rückershausen, all of Fed. Rep. of Germany

[73] Assignee: HA-WI Kunststoffe GmbH, Bad Laasphe Ruckershausen, Fed. Rep. of Germany

[21] Appl. No.: 900,290

[22] Filed: Jun. 18, 1992

[30] Foreign Application Priority Data

Jun. 18, 1991 [DE] Fed. Rep. of Germany ... 9107470[U]

[51] Int. Cl.$^5$ ............................................. B29C 45/10
[52] U.S. Cl. ..................................... 425/188; 425/189; 425/190; 425/589
[58] Field of Search ................ 425/182, 188, 189, 190, 425/185, 192 R, 589, 595

[56] References Cited

U.S. PATENT DOCUMENTS 4,797,086  1/1989  Adachi ................................ 425/589
4,911,632  3/1990  Mansfield ........................... 425/185

FOREIGN PATENT DOCUMENTS 2938665  3/1981  Fed. Rep. of Germany .
2947938  6/1981  Fed. Rep. of Germany .
8432687  5/1985  Fed. Rep. of Germany .
9100937  6/1991  Fed. Rep. of Germany .
  14729  1/1983  Japan ................................... 425/589

Primary Examiner—Tim Heitbrink
Attorney, Agent, or Firm—Fred Philpitt

[57] ABSTRACT

A gripping device for two part molds wherein each mold half is equipped with a centering ring that has outwardly projecting radial wedges, said gripping device including a gripping plate having a center bore which is adapted to fit over and around said centering ring and its outwardly projecting radial wedges, and a flat U-shaped recess extending inwardly from one side of said gripping plate and surrounding said center bore, and a gripping ring which is adapted to fit into said flat U-shaped recess, said gripping ring having inwardly projecting counter wedges which are sized and spaced apart so that they can engage the spaces between said outwardly projecting radial wedges of a centering ring in the manner of self-locking bayonet fixing means, and handle means to rotate said gripping ring while in said recess through at least a limited art with respect to the axis of said center bore.

15 Claims, 5 Drawing Sheets

GRIPPING DEVICE FOR TWO PART MOLDS

The invention relates to a gripping device.

BACKGROUND OF THE INVENTION

For processing plastics by diecasting or injection molding, individual tools are usually required for different articles, and because of the size of each charge it is also necessary to change the molds or dies rather frequently An automatic system has been proposed for mass producers so that e.g. four different dies or molds can be quickly interchanged. High expenditures are obviously inevitable for such machines. As a rule, therefore, existing machines are retooled one by one.

PRIOR ART

In order to reduce change-over times, quick-grip devices have been developed which typically include two gripping plates each having a central through-hole and clamping means such as eccentric bolts to be turned in a chuck plate in order to fix a clamping bolt inserted in a direction vertical to the chuck plane. For example, DE 29 38 665 C1 discloses a gripping system for a tool having a fluted centering flange that is clamped diametrically on either side by hydraulically operated clamping sliders with slanted engaging faces. An adapter ring in accordance with DE 84 32 687 U1 is fixed to a mounting plate by means of a fork inserted parallel to the plane of the plate or by a locking bolt. Another quick-change system employs dog levers articulated at either side and adapted to be contracted by a spindle screw on top of a clamping plate so as lock a centering ring at its retaining slope Pairs of clamping rings which can be interconnected in the manner of bayonet locking have been known from DE 29 47 938 A1. Similarly, DE 91 00 937 U1 proposes clamping plates having a center hole each for insertion, in an axial direction only, of a bayonet ring that is integral with a bent-off clamping lever which can be pivoted to some degree.

It is not always easy to rapidly and reliably change tools in accordance with the prior art. Some devices will not permit very accurate or secure clamping so that loosening under operational conditions may cause failures. Handling may be unsatisfactory, too, to quite an extent. In spite of a number of designs available, improvements are still called for.

OBJECTS OF THE INVENTION

It is an important goal of the invention to overcome the drawbacks of the prior art by creating a novel quick-grip device which facilitates changing dies or molds within minimum periods of time.

Another object of the invention is the design of a gripping structure well suited for retrofitting existing machinery The invention further aims at creating a sturdy gripping device of simplicity so as to provide for economic production and convenient use.

Still another object of the invention is an advantageous design of a gripping structure which can be handled easily and be mounted with a maximum of accuracy.

SUMMARY OF THE INVENTION

For use with injection molding machines having operating means for opening and closing divided molds, each mold half being adapted to be equipped with a centering ring that has portions of outwardly projecting radial wedges and is designed to be axially inserted into a center bore of a gripping plate at the rear face of which the centering ring is lockable by means of inwardly projecting radial counter-wedges of a gripping ring matching said radial wedges in the manner of self-locking bayonet fixing means, the invention provides a gripping plate that has at its rear side a flat U-shaped recess dimensioned to accommodate the thickness as well as the outer circumference of the gripping ring, the flat recess further encompassing the center bore with a shoulder and comprising lead-in bevels This advantageous design allows for especially convenient insertion of the gripping ring along the flat U-shaped recess portion of the gripping plate and for setting the gripping ring so as to quickly lock or release the centering ring of the respective mold half. Both mounting and use of the quick-grip device are thus greatly facilitated and much faster than with conventional means. Change-over times and, consequently, idle periods of the injection molding machine or other unit are extremely cut down; the device is also suitable for clamping onto machine tools, for attaching chucks to lathes, etc.

Convenient handling is assured by radially elastic detent means according to one embodiment, adapted to extend into a shouldered recess adjacent to the center bore for positional fixing in cooperation with relieves at the outer periphery of the ring. It is thus quite simple to slide it along the gripping plate and to actually feel the proper position desired. No further movement in an axial direction will be required.

Fail-safe positioning is obtained in accordance with an embodiment featuring two diametrically opposed notches at the outer periphery to which two spring-biased ball detents are associated at the inner periphery of a shouldered recess for locking the gripping ring in an open position in which the change of tools (dies or molds) is easily accomplished.

In the embodiment according to another embodiment, the gripping ring includes an outer socket for insertion of a manipulating means, preferably a flat lever having a handle. This design is favorable in that the gripping ring may remain at or in the gripping plate, e.g. in a captive arrangement. An alternative is provided in an embodiment whereby the gripping ring is integral with a flat bar-type member so that only the whole of the ring unit can be put into or taken out of the gripping device. When built in, however the handle end of the manipulating lever will project over the rim of the gripping plate, and consequently safeguards may be necessary to prevent inadvertent operation; such precautions may be dispensed with in case of a detachable lever.

An important improvement for which independent protection is sought consists, in accordance with another embodiment of a locating pin situated at the center bore and adapted to be radially shifted, the width of the locating pin corresponding to the widths of outer longitudinal grooves at the centering ring which, according to another embodiment, may include four outer grooves offset to each other by 90-degree angles. The locating pin will engage such an outer groove for exact precentering of the mold half in order to warrant proper assembly positioning.

Mounting is advantageously effected by the design of claim 8 wherein the centering ring comprises four holes for receiving screws, said holes being arranged radially inside the wedges such that the diametrical intersecting lines are at angles of 45 degrees each relative to the diametrical intersecting lines of the outer longitudinal grooves, permitting optimum economy of space as well as rapid attaching or detaching. There is also plenty of cheek for the fixing screws In accordance with another embodiment, the locating pin is shiftable along a guide bore and is lockable in at least two defined positions which is most useful for both quick and exact precentering. A further embodiment provides for spring-loading of the locating pin which is provided with setting means at a small face of the gripping plate so that any adjustment can be easily performed In the embodiment according to another embodiment, the device may be centered by means of an adapter that is provisionally inserted into the center bore in place of the centering ring, and when the gripping plate has been secured to a base plate of a molding machine, the adapter means is removed and the centering ring of the respective mold half is inserted This mode of assembly will do away with touching up, which had occasionally been tried with prior art devices under application of force.

Yet another advantage of the invention resides in the design of another embodiment whereby a thermally insulating slab is attached or adapted to be attached between the gripping plate and a machine base plate. Contrary to the conventional practice, it is thus not necessary to provide an individual insulating slab for each mold or die.

In additional modified embodiments, there are at the outer periphery of the gripping ring two series of diametrically opposed notches arranged side by side preferably at a rear decline each of a counter wedge. This will assist in holding the gripping ring in a provisional angular position until actively seized by an operator for either locking or releasing.

Further specializations, embodiments, modifications, details and advantages of the invention will become evident from the

Figure 2:
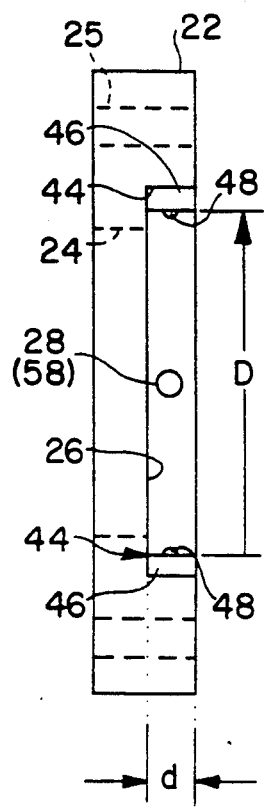
Figure 3:
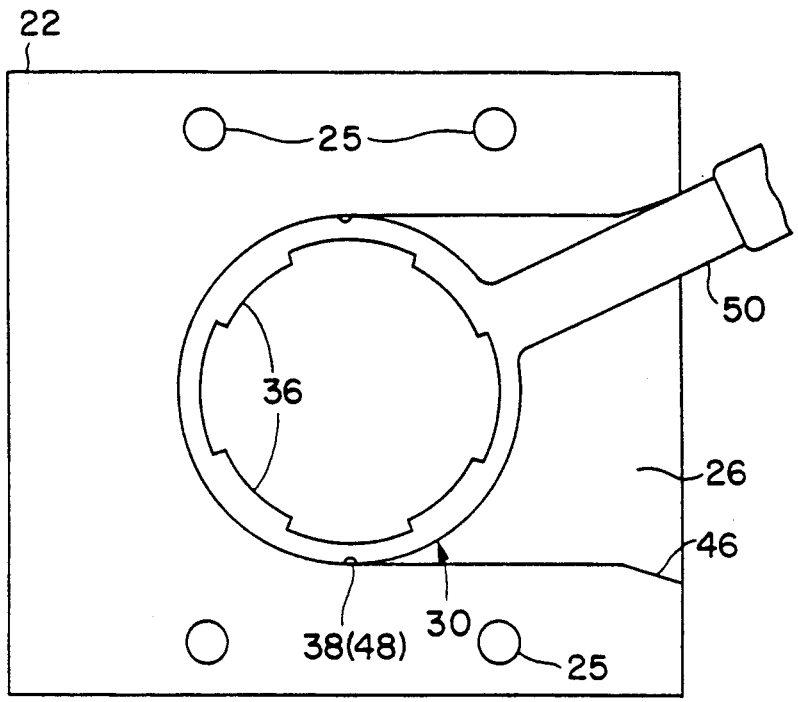
Figure 4:
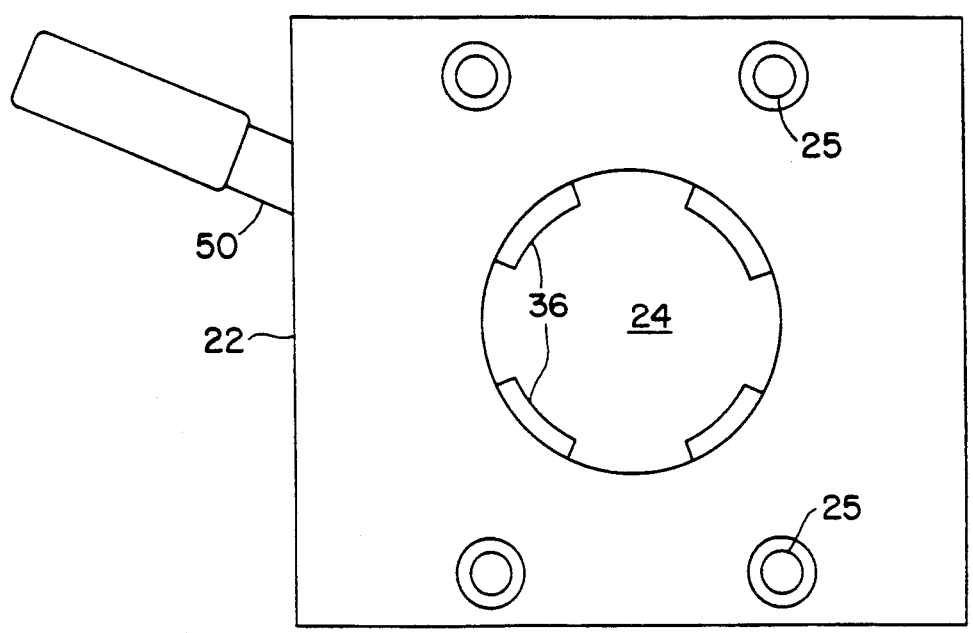
Figure 5:
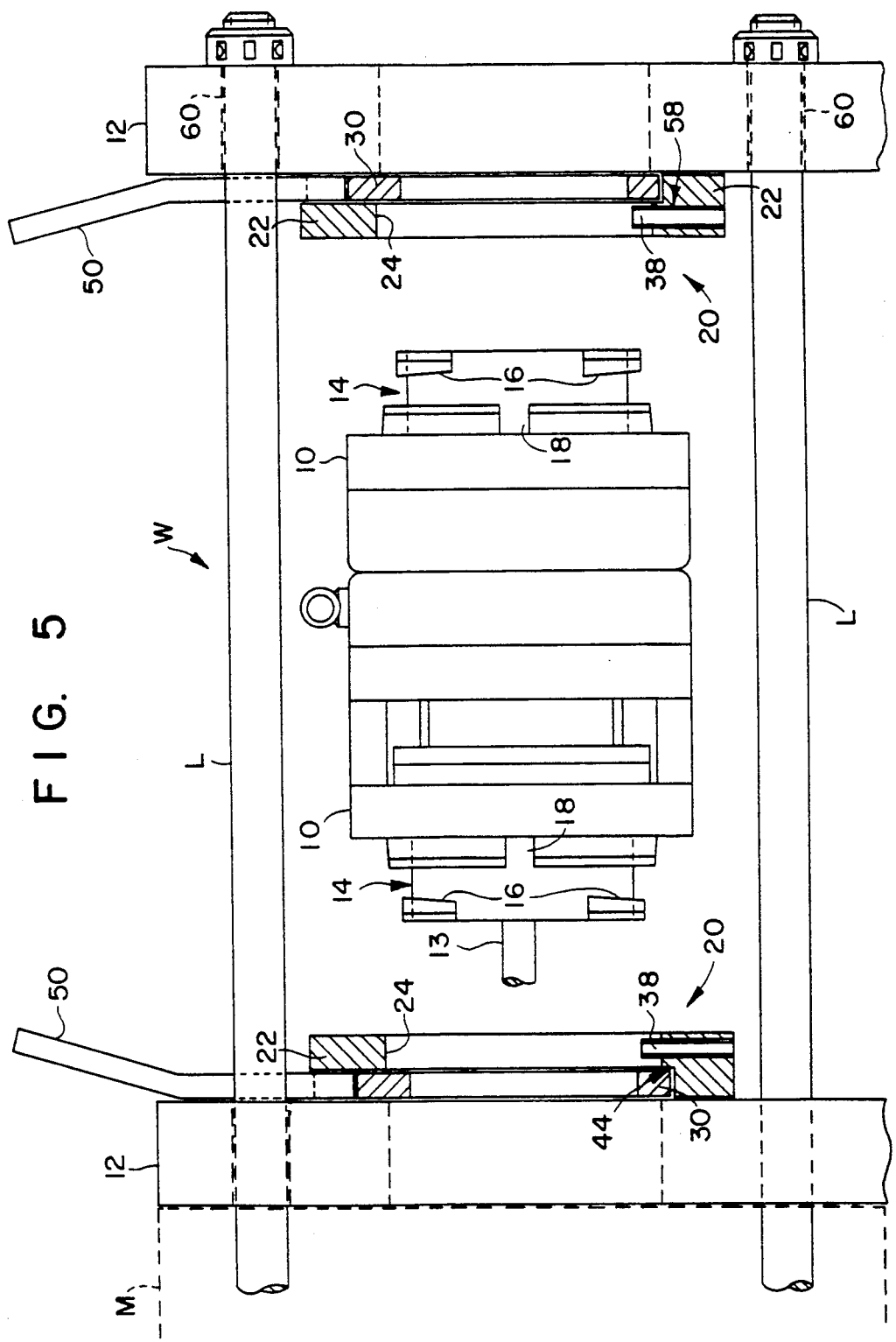
Figure 6:
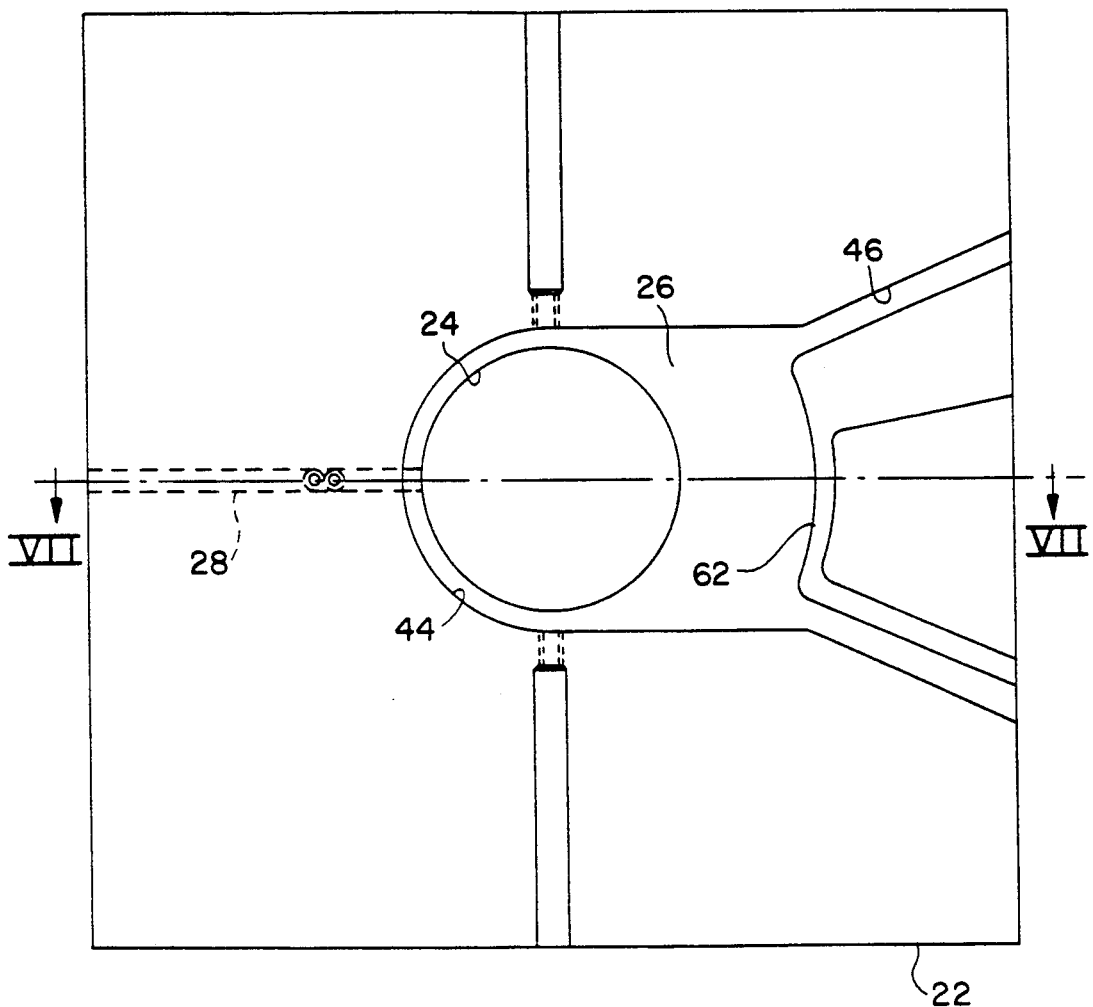
Figure 7:
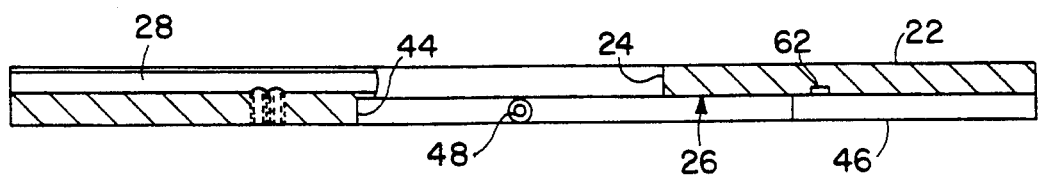
Figure 8:
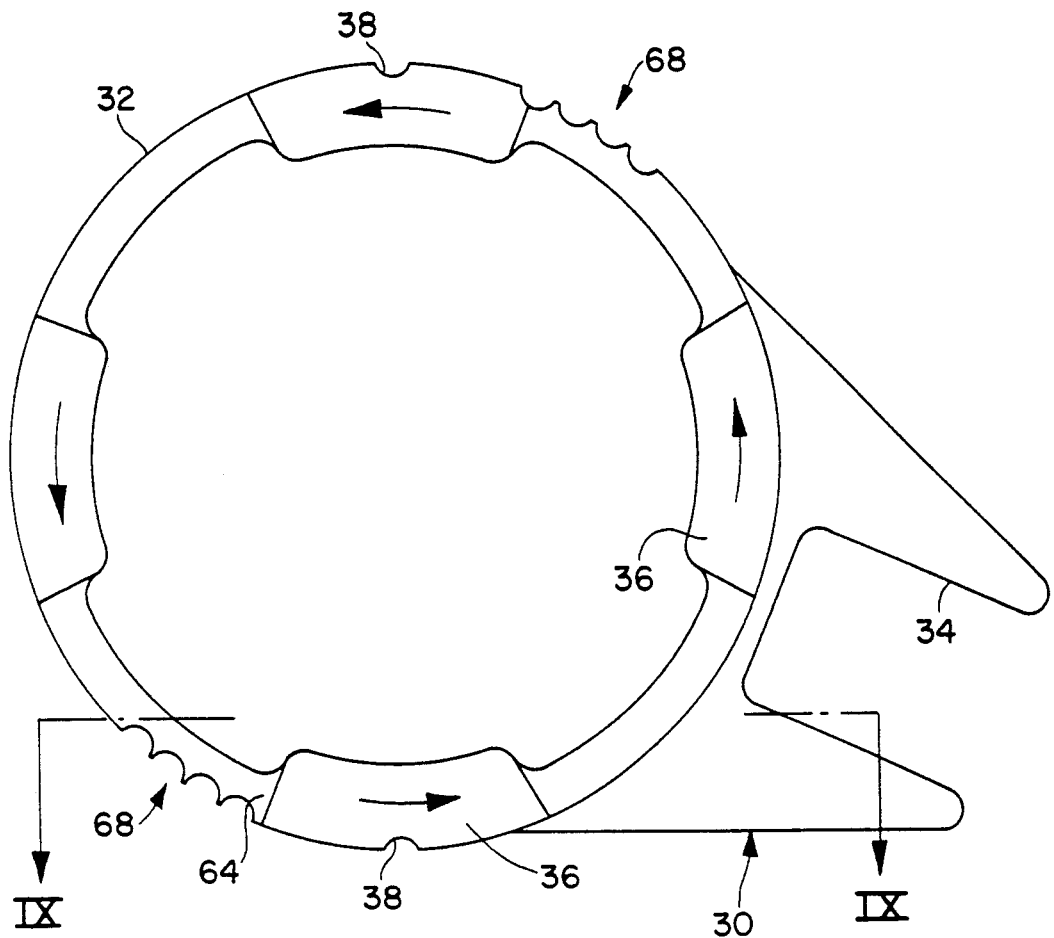
Figure 9:
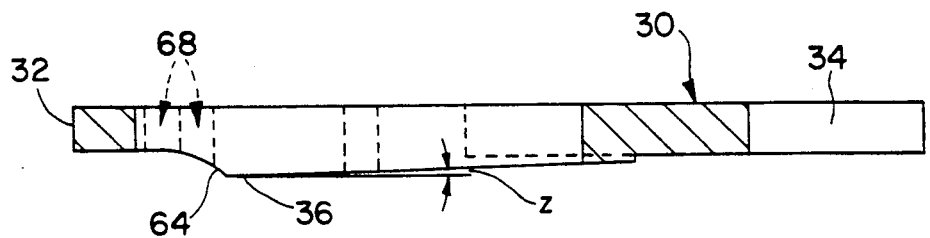

THE DRAWINGS wherein:

FIG. 1 is an exploded perspective view of a mold portion and an associated quick-grip device, FIG. 2 is a side elevation of a gripping plate, FIG. 3 is a face view, seen from the machine side, of the gripping plate shown in FIG. 2, FIG. 4 is a face view, seen from the mold side, of the gripping plate shown in FIGS. 2 and 3, and FIG. 5 is a partly sectional side elevation of built-in quick-grip devices including a mold therebetween in a non-gripping position, FIG. 6 is a face view of another gripping plate, FIG. 7 is a sectional view along line VII—VII in FIG. 6, FIG. 9 is a sectional view along line IX—IX in FIG. 8.

SPECIFIC DESCRIPTION

At a mold half 10 (merely indicated in FIG. 1) of a mold W (FIG. 5) which contains a cavity (not shown) for manufacturing plastics articles by way of injection molding, there is a machine base plate 12 having a centering ring 14 that is secured by means of screws 15 and comprises radial projections or wedges 16 for locking a gripping plate 22 of a quick-grip device 20. Outer longitudinal grooves 18 that are preferably arranged at peripheral 90-degree points of the centering ring 14 serve to correctly position the mold half 10 to the gripping plate 22. The latter includes a locating pin 28 (FIG. 1) arranged in a guide bore 58 for radial shifting so as to engage one of the grooves 18 if such a predetermined position is desired for centering the mold half 10. However, if the mold is to be mounted in a slanted position, the locating pin 28 can be pulled out whereby it is disengaged and clamping will be possible in any intermediate position.—The mold half 10 may be provided with an ejector 13 (FIG. 5).

The gripping plate 22 of the device 20 comprises a center bore 24 whose size matches that of the centering ring 14. Holes 5 serve to receive fastening screws 56. If a heat insulating slab 52 is to be attached, the latter also includes holes 55 as well as a center bore 54 whose size matches that of center bore 24 in the gripping plate 22 for aligned mounting.

An important feature of the gripping plate 22 is a flat U-shaped portion or recess 26 including lead-in bevels 46 for easy sliding-in of a gripping ring 30 from a lateral position. The outer periphery 32 of the gripping ring 30 is exactly tuned to the depth (or height) of the flat U-shaped recess 26. In addition, the outer periphery 32 of the gripping ring 30 has notches 38 preferably in a diametrically opposing arrangement for cooperation with spring biased ball detents 48 situated at either side of the center bore 24 adjacent to a shoulder 44 formed by the flat U-shaped recess 26. By sliding the gripping ring 30 into this shouldered recess 26/44, its notches 38 are engaged by the bal detents 48 as the gripping ring 30 reaches the position thus defined.

The gripping ring 30 may have an outer socket 34 for inserting a flat lever 40 provided with a handle 42 (FIG. 1). The invention also contemplates the use of a gripping ring 30 that is integral with a flat bar-type lever 50 (FIGS. 3 to 5). At any rate the gripping ring 30 includes counter-wedges 36 matching the radial wedges or projections 16 of the centering ring 14. If, therefore, the latter is inserted through the center bore 24 of the gripping plate 22 and through the gripping ring 30 as it is in its open position (FIGS. 3 and 4), it is possible to pivot the gripping ring downwardly simply by pressing down the lever 50 (or 40, respectively) so that the radial wedges 16 will engage the counter-wedges 36 in a self-locking manner. The mold half 10 is thus precisely fixed to the gripping plate 22. Detaching is effected simply by upward pivoting of the lever 50 (or 40, respectively).

The assembly drawing of FIG. 5 shows a schematically indicated machine M having guide rods L for moving base plates 12 to and fro. In practical working one mold half 10 (lefthand in FIG. 5) will be fixed first, viz. to the associated base plate 12 by the gripping plate 22 of one device 20, whereupon this base plate 12 is shifted along the guide rods L with the tool (mold or die) W towards the other base plate 12 (righthand in FIG. 5), and finally the other mold half 10 is fixed by means of the second quick-grip device 20 there. The base plates 12 include slide bores 60 for receiving the guide rods L. Machines M customarily comprise two or four such guide rods L.

A slightly modified gripping plate 22 is shown in FIGS. 6 and 7 for use with a modified gripping ring 30 as shown in FIGS. 8 and 9. This gripping plate 22 includes a flat recess 26 with broad lead-in bevels 46. Adjacent to the latter, there are further relieves part of which is seen by way of a flute 62. These relieves will assist in applying and removing the gripping ring 30 and the flat lever 40 or the unit comprising the flat bar 50.

Two opposite ball detents 48 are provided as in the embodiment of FIGS. 2 and 3 and again a locating pin 28 is accommodated in the gripping plate 22 with two fixing positions being merely indicated by way of tapped holes into which a set screw (not shown) may be inserted.

It will be seen from FIGS. 8 and 9 that the gripping ring 30 here is provided with two opposite series 68 of notches designed to cooperate with the ball detent pair 48 of the gripping plate 22. The notches of these series 68 lie side by side behind a steep rear decline 64 each of two counter wedges 36 whose wedge angle z is seen in FIG. 9. The notch series 68 hold the inserted gripping ring 30 in one of the detent positions so that one notch each will be engaged by the associated ball detent 48 if the gripping ring 30 is in a suitable angular position. Arrows on the counter wedges 36 show the direction of retightening for the gripping ring 30. Applying and removing it for locking and relieving respectively an associated centering ring 14 of a mold half 10 (see FIG. 5) will thus be much facilitated. At the same time, this is also a safety feature since the gripping ring 30 held by the detents 48/68 will remain in the respective position until actively seized by an operator. It is, moreover, possible to provisionally adjust the centering device and to lock or release it after performing final adjustments.

Summarizing a review of a preferred embodiment, it will be seen that the invention provides a novel gripping device 20 in particular for use with injection molding machines having divided molds each half 10 of which comprises a centering ring 14 with portions of outwardly projecting radial wedges 16. A gripping plate 22 having a center bore 24 for introducing the centering ring 14 is locked thereto by a gripping ring 30 with matching radial counter-wedges 36 for bayonet-type fixing. The rear side of the gripping plate 22 comprises a flat U-shaped recess 26 which is dimensioned for accommodating both thickness d and circumference of the gripping ring 30 and which includes a shoulder 44 as well as lead-in bevels 46. A locating pin 28 that is spring-loaded and adjustable in a radial direction relative to the center bore 24 has setting means at a small face of the gripping plate 22 for snap-in locking in an outer longitudinal groove 18 of the centering ring 14. Resilient detents such as spring-biased balls 48 at or around the center bore 24 engage peripheral notches 38, 68 of the gripping ring 30 which either comprises an outer socket 34 for insertion of a flat lever 40 that has a handle 42 or is integral with a flat bar-type lever 50. A heat insulating slab 52 may be provided between the gripping plate 22 and a machine base plate 12.

The gripping device 20 is also suited camping onto machine tools, for attaching chucks to lathes, etc. It reduces changeover times to a minimum and permits the convenient connection of cooling water and air pipes. The gripping plates made of high-quality steel warrant that damage to clamping plates will not occur, whereas with the prior art, stripped threads could frequently not be avoided. Moreover, safety hazards are prevented since there are no projecting components that might cause injuries. No additional tools are required for the new system; such auxiliary means had conventionally brought about risks by parts falling due to breaking bolts or deficient fixing.

While preferred embodiments have been illustrated and explained hereinabove, it should be understood that numerous variations and modifications will be apparent to one skilled in the art without departing from the principles of the invention which, therefore, is not to be construed as being limited to the specific forms described.

We claim:

1. An injection molding machine having two opposed mold halves, operating means for opening and closing said mold halves, each mold half being equipped with a centering ring having outwardly projecting radial wedges, a pair of machine base plates, each base plate having a gripping plate mounted thereon, each gripping plate having a center bore whereby each centering ring is located in one of said center bores, each of said centering rings being lockable by projecting radial counter wedges of a gripping ring matching said projecting radial wedges, wherein each gripping plate has a rear side thereof, a flat U-shaped recess dimensioned to accommodate the thickness as well as the outer circumference of the gripping ring, each flat U-shaped recess further encompassing a corresponding one of said center bores with a shoulder and having lead-in bevels.

2. A gripping device (20) for two part molds wherein each mold half is equipped with a centering ring (14) that has outwardly projecting radial wedges (16), said gripping device (20) comprising
   (a) a gripping plate having
      (1) a center bore (24) which is adapted to fit over and around said centering ring (14) and its outwardly projecting radial wedges (16), and
      (2) a flat U-shaped recess (26) extending inwardly from one side of said gripping plate (22) and surrounding said center bore (24), and,
   (b) a gripping ring (30) which is adapted to fit into said flat U-shaped recess (26), said gripping ring (30) having inwardly projecting counter wedges (36) which are sized and spaced apart so that they can engage the spaces between said outwardly projecting radial wedges (16) of a centering ring (14) in the manner of a self-locking bayonet, and
   (c) handle means (40, 42) to rotate said gripping ring (30) while in said recess (26) through at least a limited arc with respect to the axis of said center bore (24).

3. A device according to claim 2, which includes radially elastic detent means (48) mounted in said recess (26) and notches (38) in the outer periphery of said gripping ring (30) that are adapted to engage and disengage each other.

4. A device according to claim 2 which includes two diametrically opposed notches (38) in the outer periphery of said gripping means (30) and two spring-biased ball detents (48) located in a shouldered recess (44) of said recess (26) that are positioned to engage and disengage each other.

5. A device according to claim 2 wherein said gripping ring (30) includes an outer socket (34) which is adapted to engage said 6. A device according to claim 2 wherein said gripping ring (30) is integral with a flat bar member (50).

7. A device according to claim 2 wherein said gripping plate includes a locating pin (28) adapted to be radially shifted and which is dimensioned so that its width corresponds to the widths of the outer longitudinal grooves (18) in a centering ring (14).

8. A device according to claim 7 wherein the centering ring (14) includes four outer grooves (18) offset to each other by 90-degree angles.

9. A device according to claim 8 wherein the centering ring (14) includes four holes for receiving screws (15), said holes being arranged radially inside said wedges (16) so that their diametrical intersecting lines are at angles of 45 degrees each relative to the diametrical intersecting lines of said outer longitudinal grooves (18).

10. A device according to claim 8 wherein said locating pin (28) is shiftable along a guide bore (58) and is lockable in at least two positions.

11. A device according to claim 8 wherein said locating pin (28) is spring-loaded and is provided with setting means on the face of the gripping plate (22), said setting means providing snap-in locking for the locating pin.

12. A device according to claim 2 wherein a thermally insulating slab (52) is attached to the gripping plate (22).

13. A device according to claim 4 wherein two series of diametrically opposed notches (68) are provided on the outer periphery (32) of said gripping ring (30) which are adapted to cooperate with the spring-biased ball detents (48) of the gripping plate (22).

14. A device according to claim 13 wherein the notches of each series (68) are arranged side-by-side, each series (68) comprising at least three notches of identical shape.

15. A device according to claim 13 wherein each series of notch (68) is arranged at the rear slope (64) of a counter wedge (36).

* * * * *